United States Patent
Tom et al.

(10) Patent No.: US 8,880,909 B2
(45) Date of Patent: Nov. 4, 2014

(54) AUTO-DETECT POLLING FOR CORRECT HANDSHAKE TO USB CLIENT

(75) Inventors: Steven R. Tom, Dallas, TX (US); Leland Scott Swanson, McKinney, TX (US)

(73) Assignee: Texas Instruments Incorporated, Dallas, TX (US)

(*) Notice: Subject to any disclaimer, the term of this patent is extended or adjusted under 35 U.S.C. 154(b) by 827 days.

(21) Appl. No.: 12/774,549

(22) Filed: May 5, 2010

(65) Prior Publication Data

US 2011/0016334 A1 Jan. 20, 2011

Related U.S. Application Data

(60) Provisional application No. 61/226,981, filed on Jul. 20, 2009.

(51) Int. Cl.
*G06F 1/00* (2006.01)
*G06F 1/32* (2006.01)

(52) U.S. Cl.
USPC ........... 713/300; 713/320; 713/330; 709/203; 370/278; 370/346; 370/449

(58) Field of Classification Search
USPC ........... 713/300, 320, 330; 709/203; 370/278, 370/346, 449
See application file for complete search history.

(56) References Cited

U.S. PATENT DOCUMENTS

| | | | |
|---|---|---|---|
| 7,895,385 B2 * | 2/2011 | Raju | 710/305 |
| 2003/0172300 A1 * | 9/2003 | Parry | 713/201 |
| 2010/0007473 A1 * | 1/2010 | Fadell | 340/310.11 |

OTHER PUBLICATIONS

Pending U.S. Appl. No. 12/816,259, filed Jun. 15, 2010 for "Continuous Monitoring of a USB client for BCS Charging Capacity" of Steven R. Tom et al. pp. 1-37.

* cited by examiner

*Primary Examiner* — Michael J Brown
(74) *Attorney, Agent, or Firm* — William B. Kempler; Frederick J. Telecky, Jr.

(57) ABSTRACT

An embodiment of the invention provides a method for providing power to a USB client device and polling for a correct protocol. A USB host device provides power and a first part of a first handshake determined by a first protocol. The host then monitors the client for a second part of the first handshake. When the second part of the first handshake is detected by the host, the client recognizes that power may be applied according to the first protocol. When the second part of the first handshake is not presented by the client device, the host provides a first part of a second handshake according to a second protocol. When the second part of the second handshake is provided by the client, the host the client recognizes that power may be applied according to the second protocol.

20 Claims, 4 Drawing Sheets

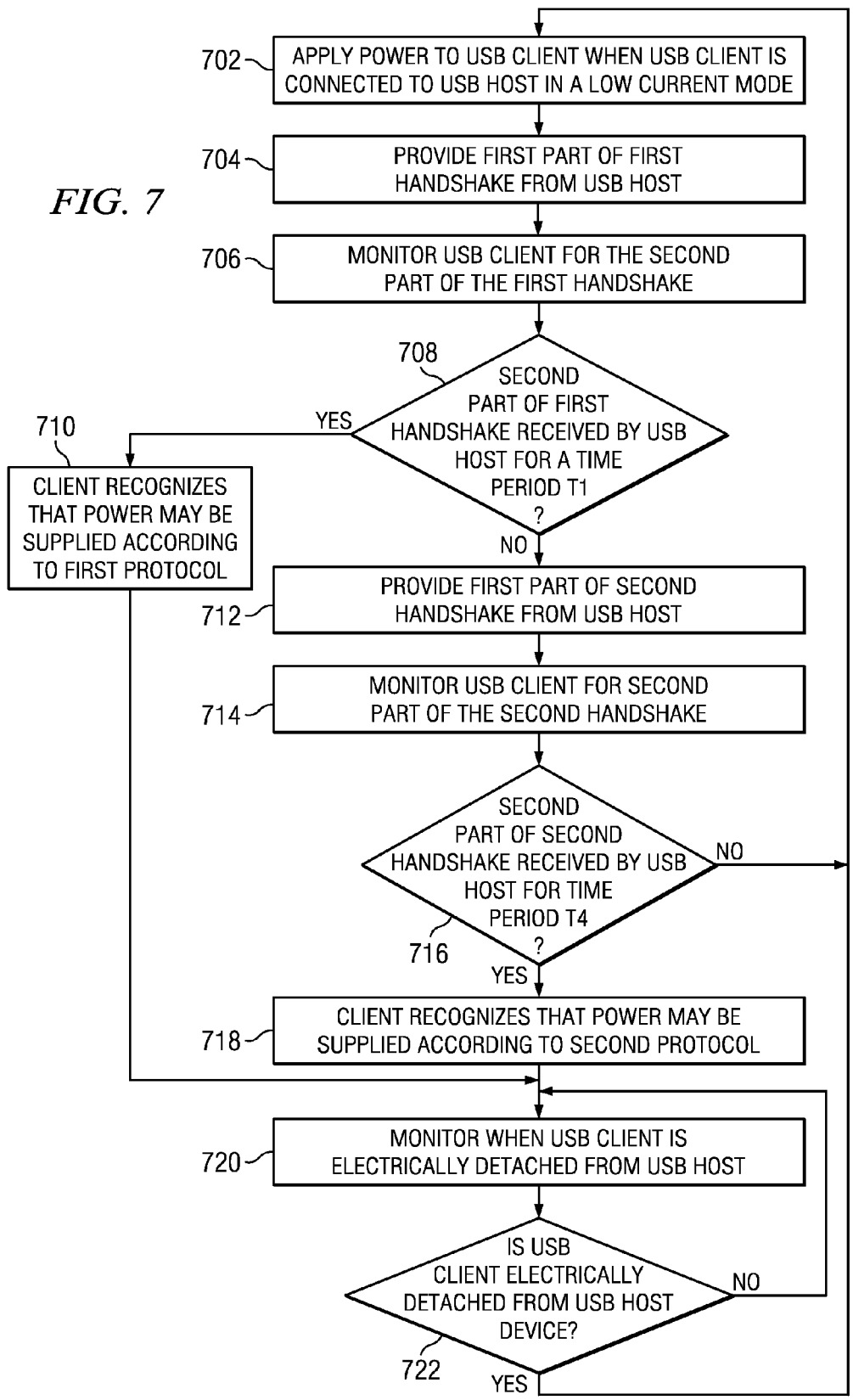

AUTO-DETECT POLLING FOR CORRECT HANDSHAKE TO USB CLIENT

BACKGROUND

Many portable, battery-powered devices (e.g. mobile handsets, keyboards, personal digital assistants) recharge their batteries through a DCP (dedicated charging port) such as an AC-to-DC (alternating current to direct current) wall-wart adapter or a hub port. A wall-wart is small power supply brick with an integral male plug. The wall-wart is designed to plug directly into a wall outlet. It is called a "wart" because when it is installed on a power strip it tends to block at least one more socket than it uses.

These portable, battery-powered devices may also recharge their batteries through a CDP (charging down-stream port). A CDP usually has a five volt power supply provided from the USB (universal serial bus) ports on PCs (personal computers) such as laptop, desktop and notebook PCs. Commonly, the portable device has only one input which is designed for USB compatibility in order to save space (as opposed to having a separate wall-wart connector).

When a portable device has one input, for example a USB compatible input, the portable device usually cannot differentiate when it is plugged into a CDP versus being plugged into a DCP such as a wall-wart adapter. Usually, a CDP has a current limit of 500 ma (milliamps) while a DCP can provide much more current. For example, some dedicated charging ports can provide 1.5 amps to a portable device. Because most portable devices cannot differentiate when they are plugged into a CDP versus being plugged into a DCP, most portable devices limit the amount of current they draw to ensure that the portable devices do not overload the power source.

Several recent standards have defined protocols that allow a portable device to differentiate between different power sources to allow the portable device to draw maximum current from a source. Drawing maximum power from the source reduces the time required to charge the portable device. Several recently released industry standards such as the Chinese PRC Telecommunications Industry Standard YD/T 1591-2006 and USB 2.0 Battery Charging Specification 1.1 (BSC1.1) define both power sources, to handshaking protocols and allowable current draws. Other proprietary-based schemes (such as Apple's method for charging iPods and iPhones) are company specific. These standards define how a portable device communicates with a host device to determine the maximum allowable current draw.

These different standards are not necessarily compatible with each other. For example, a portable device following one standard may not communicate with a host device following a second standard.

BRIEF DESCRIPTION OF THE DRAWINGS

FIG. 7 is a flow chart illustrating an embodiment of a method of providing power to a USB client device and polling for a correct protocol.

DETAILED DESCRIPTION

The drawings and description, in general, disclose embodiments of a method and apparatus for detecting one protocol for charging a USB client device from other protocols for charging a USB client device. After detecting the correct protocol, a USB client device recognizes that power may be supplied according to the correct protocol. In summary, a USB host device provides power and a first part of a first handshake according to a first protocol on common data lines (D+ and D−) to a USB client device. After providing the first part of the first handshake, the USB host device monitors the data lines for a second part of the first handshake from the USB client device.

When the second part of the first handshake is provided by the USB client device, the USB host device continues to supply power to the USB client device and the USB client device recognizes that power may be supplied according to the first protocol if required. When the second part of the first handshake is not provided by the USB client device, the USB host device provides a first part of a second handshake according to a second protocol on common data lines (D+ and D−) to the USB client device. After providing the first part of the second handshake, the USB host device monitors the data lines for a second part of the second handshake from the USB client device. When the second part of the second handshake is provided by the USB client device, the USB host device continues to supply power to the USB client device and the USB client device recognizes that power may be supplied according to the first protocol if required.

The USB host device may continue to provide additional handshakes beyond the two handshakes previously described when the first two handshakes do not identify the correct charging protocol. In a case where no handshakes are identified, the process starts over again by looking for the first handshake.

After power is delivered to the USB client device, the USB host device monitors the data lines looking for a condition that indicates that the current USB client device has been electrically removed from the USB host device. When the USB host device detects that the current USB client device has been removed and a USB client device is subsequently connected, the USB host device applies the first part of the first handshake according to the first protocol to the data lines and the process is repeated as described above.

Figure 1:
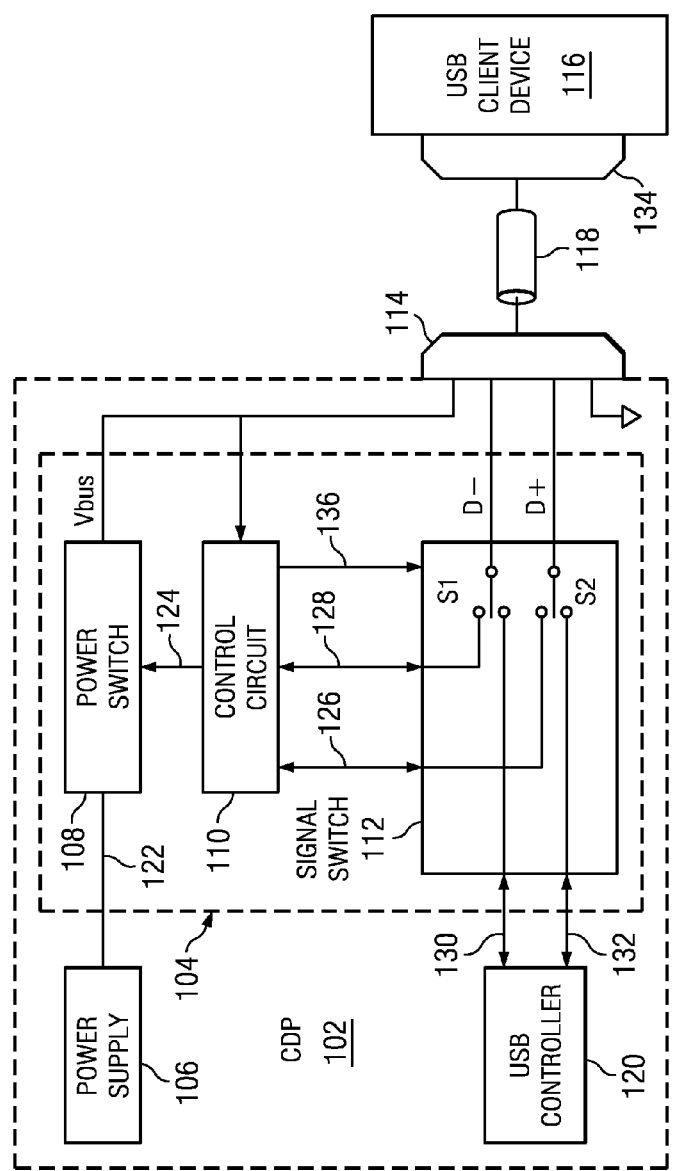
FIG. 1 is a schematic diagram of an embodiment of a charging down-stream port (CDP) for providing power to a USB client device.

FIG. 1 is a schematic diagram of an embodiment of a CDP 102 for providing power to a USB client device 116. A CDP 102 includes but is not limited to a desktop computer, a laptop computer and a notebook computer. A USB client device 116 includes but is not limited to a mobile handset, a keyboard and a PDA (personal digital assistant). In this embodiment the CDP 102 includes a power supply 106, a USB controller 120, a power switch 108, a control circuit 110, a signal switch 112 and a USB connector 114. In this example, a USB cable 118 electrically connects the USB connector 114 to the USB connector 134 on the USB client device 116. The power switch 108, the control circuit 110 and the signal switch 112 may be integrated on a single integrated circuit 104.

In this embodiment, the Vbus is connected to the power switch 108 and the USB connector 114. The Vbus is used to transfer power from the power supply 106 to the USB client device 116 when the power switch 108 is closed. A power switch 108 may be implemented using transistors such as MOSFETs (metal-oxide semiconductor field-effect transistors), bipolar transistors and JFETs (junction field-effect transistors). The power switch 108 is controlled by the control circuit 110 through electrical connection 124. The control circuit 110 also senses the current drawn through the Vbus and as a result controls how much current is drawn. The amount of current drawn through the Vbus is dependent on the particular protocol used at the time.

In this embodiment, the control circuit 110 includes a charge pump and current-limit circuitry (not shown). The power supply 106 is electrically connected to the power switch 108 through connection 122. The power supply 106 may supply current at any voltage. In this embodiment, the voltage of the power supply 106 is approximately 5 volts.

The control circuit 110 also controls the signal switch 112 and the voltages or impedances that are connected to the data lines D+ and D−. The control circuit 110 controls the signal switch 112 through electrical connection 136. Voltages or impedances are connected to the data lines D+ and D− through connections 126 and 128 respectively. Voltages on data lines D+ and D− are also read by the control circuit 110 through connections 126 and 128. The USB controller 120 is electrically connected to the signal switch 112 through electrical connections 130 and 132.

The signal switch 112 in this example includes two switches S1 and S2. In this example, when the CDP 102 configures itself as a DCP and polls for a correct handshake, S1 electrically connects data line D− to electrical connection 128 and S2 electrically connects data line D+ to electrical connection 126. When data is communicated from the USB client device 116 to the USB controller 120, the host device 102 is in CDP mode and S1 electrically connects data line D− to electrical connection 130 and S2 electrically connects data line D+ to electrical connection 132. As will be explained in more detail, when a DCP is used, which does not have data communication capabilities, switches S1 and S2 are not required.

Data lines D+ and D−, along with Vbus and ground, are electrically connected to USB connector 114. A USB cable 118 connects USB connector 114 to the USB connector 134 mounted on the USB client device 116.

In an embodiment, the power switch 108, the control circuit 110 and the signal switch 112 may be combined on an individual integrated circuit 104.

In this embodiment, before a USB client device 116 is electrically connected to the CDP 102, the CDP 102 is in DCP mode and provides a first part of a first handshake through integrated circuit 104 according to a first protocol to the data lines D+ and D−. In this embodiment, the first part of the first handshake includes electrically connecting the data lines D+ and D− to the control circuit 110 through electrical connections 126 and 128 to respectively. After making this connection, the control circuit 110 applies the first part of the first handshake on the data lines D+ and D− by changing the electrical conditions on the data lines D+ and D−. For example, the electrical conditions may be changed by applying voltages on data lines D+ and D−, changing the impedance between data line D+ and data line D−, or changing the impedance to ground for both data lines D+ and D−. Each of these electrical conditions will now be discussed individually in more detail.

Figure 2:
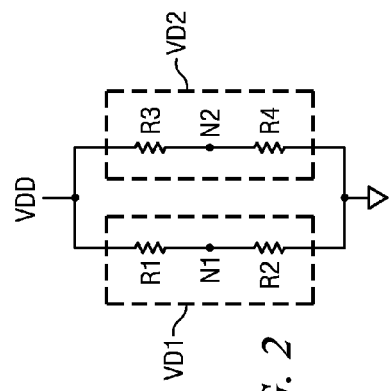
FIG. 2 is a schematic diagram of an embodiment of a circuit for providing a first voltage and a second voltage as part of a handshake.

FIG. 2 is a schematic diagram of an embodiment of a circuit for providing a first voltage and a second voltage to data lines D+ and D− as part of a first part of a first handshake. This embodiment of a circuit for providing the first voltage and the second voltage to the data lines D+ and D−includes two voltage dividers VD1 and VD2. These voltage dividers VD1 and VD2, in this example, are located in the control circuit 110. The first voltage divider VD1 includes resistors R1 and R2. In this example, the first voltage is provided at node N1. The second voltage divider VD2 includes resistors R3 and R4. In this example, the second voltage is provided at node N2. The voltage dividers VD1 and VD2 also provide input impedances for the USB client device through data lines D+ and D−. In a first example, the first voltage is approximately 2.0 volts and the second voltage is approximately 2.7 volts.

Other circuits may be used to apply voltages on the data lines D+ and D−. For example, op-amps with specified output impedance located in the control circuit 110 may be used to provide the first and second voltages.

Figure 3:
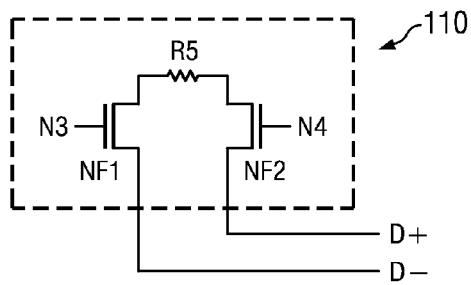
FIG. 3 is a schematic diagram of an embodiment for providing impedance between data lines as part of a handshake.

FIG. 3 is a schematic diagram of an embodiment for providing impedance between data lines data lines D+ and D− as a first part of a first to handshake. In this example, the first part of the first handshake provided by the control circuit 110 includes electrically coupling data line D− to resistor R5 and electrically coupling data line D+ to resistor R5. In this example, the resistor R5 forms an electrical impedance between data lines D+ and D−. The value of R5, in this example, ranges from 0 ohms to 200 ohms.

The source of NFET (n-type field-effect transistor) NF1 is connected to data line D−, the gate of NFET NF1 is connected to node N3 and the drain of NFET NF1 is connected to resistor R5. The source of NFET (n-type field-effect transistor) NF2 is connected to data line D+, the gate of NFET NF2 is connected to node N4 and the drain of NFET NF2 is connected to resistor R5. The control circuit 110 applies a high logic level to nodes N3 and N4 when a first part of a handshake requires an impedance between data lines D+ and D−.

Figure 4:
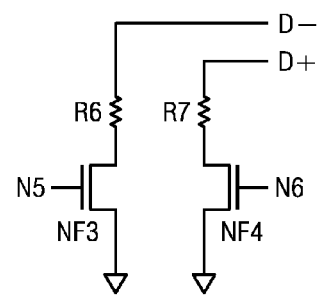
FIG. 4 is a schematic diagram of an embodiment for providing impedance from each data line to ground as part of a handshake.

FIG. 4 is a schematic diagram of an embodiment for providing impedance from each data line D+ and D− to ground as a first part of a first handshake. In this example, the first part of the first handshake provided by the control circuit 110 includes electrically coupling resistor R6 to ground and electrically coupling resistor R7 to ground. The values of R6 and R7, in this example, range from 0 ohms to 200 ohms.

The source of NFET (n-type field-effect transistor) NF3 is connected to ground, the gate of NFET NF3 is connected to node N5 and the drain of NFET NF3 is connected to resistor R6. The resistor R6 is also connected to data line D−. The source of NFET (n-type field-effect transistor) NF4 is connected to ground, the gate of NFET NF4 is connected to node N6 and the drain of NFET NF4 is connected to resistor R7. The resistor R7 is also connected to data line D+. The control circuit 110 applies a high logic level to nodes N3 and N4 when a first part of a handshake requires an impedance to ground on data lines D+ and D−.

After a first part of the first handshake is applied to the data lines D+ and D− according to a first protocol, the control circuit 110 waits for a predetermined time period T1 for the USB client device 116 to apply a second part of the first handshake to the data lines D+ and D− according to the first protocol. The second part of the first handshake may include applying voltages or currents to the data lines D+ and D− by the USB client device 116. The specific voltages or currents applied during the second part of the first handshake are determined by the particular protocol used. No response from the USB client device may also be used as a second part of the first handshake. No response from the USB client includes not applying voltages or currents to the data lines D+ and D− by the USB client device 116.

In this embodiment, the second part of the first handshake is correct when the USB client device 116 does not respond to the first part of the first handshake in a time period T2. The time period T2 in this example is 20 milliseconds. In this embodiment, after the control circuit 110 recognizes that the first handshake is correct, the CDP 102 does not poll for another handshake. When the first handshake is correct, power continues to be supplied from the CDP 102 to the USB client device 116 and the USB client device 116 recognizes that power may be supplied according to the particular charging specification of the first protocol if required.

In this embodiment, the first protocol may allow the CDP 102 to supply 0.5 amps or more of current for charging the USB client device 116. Power is supplied by the power supply 106 through electrical connection 122 into power switch 108. Power switch 108 is enabled and controlled by control circuit 110. When power switch 108 is enabled, current is drawn from the power supply 106 through the Vbus to charge the USB client device 116. The current drawn from the power supply 106 is also sensed by the control circuit 110.

In this embodiment of the invention, when the USB client device 116 applies voltages or currents to the data lines D+ and/or D−, within the time period T2, the second part of the first handshake is incorrect. In this embodiment of the invention, when the first handshake is incorrect, the status of the USB client device 116 must be reset and a first part of a second handshake is provided by the control circuit 110 according to a second protocol. In another embodiment, the status of the USB client device 116 does not need to be reset and the first part of the second handshake is provided by the control circuit 110 according to the second protocol.

In this embodiment of the invention, the status of the USB client device 116 is reset by powering down the USB client device 116, waiting a time period T3 and then applying power to the USB client device 116. The USB client device is powered down by opening the power switch 108 and discharging the Vbus to a predetermined voltage. In this example, the predetermined voltage is 0.3 volts or less and the wait time T3 is approximately 300 milliseconds. Power is applied to the USB client device 116 by closing the power switch 108 and applying power from the power supply 106 to the Vbus.

In this embodiment of the invention, after the USB client device 116 has been reset and power applied to the USB client device 116, a first part of a second handshake is applied to the data lines D+ and D− according to the second protocol. The first part of the second handshake may be applied in the same way as the first part of the first handshake was applied as previously discussed. In this embodiment of the invention, the first part of the second handshake includes applying an impedance between data line D+ and D− as shown in FIG. 3. However, in another embodiment, the control circuit 110 may apply voltages to data lines D+ and D− as shown in FIG. 2. In another embodiment, the control circuit may apply an impedance from the D+ data line to ground and an impedance from the D− data line to ground as shown in FIG. 4.

In this embodiment of the invention, after the first part of the second handshake has been applied to the data lines D+ and D− according to the second protocol, the control circuit 110 waits for a predetermined time period T4 for the USB client device 116 to apply a second part of the second handshake to the data lines D+ and D− according to the second protocol. In this embodiment, the time period T4 is 20 milliseconds. The second part of the second handshake may include applying voltages or currents to the data lines D+ and D− by the USB client device 116 or not applying voltages or currents by the USB client device 116. The specific voltages or currents to applied during the second part of the handshake are determined by the particular protocol used. For example, the protocol may be the Chinese PRC Telecommunications Industry Standard YD/T 1591-2006 or the USB 2.0 Battery Charging Specification 1.1 (BSC1.1).

In this example, when the USB client device 116 sends the is second part of the second handshake to the data lines D+ and D− according to the second protocol within the time period T4, power continues to be supplied from the CDP 102 in a DCP mode to the USB client device 116 and the USB client device 116 recognizes that power may be supplied according to the particular charging specification of the second protocol if required. For example, the second protocol may indicate to the USB client 116 that it may draw 0.5 amps or more of charging current from the CDP 102. Power is supplied by the power supply 106 through electrical connection 122 into power switch 108. Power switch 108 is enabled by control circuit 110. When power switch 108 is enabled, current is drawn from the power supply 106 through the Vbus to charge the USB client device 116. The current drawn from the power supply 106 is also sensed by the control circuit 110.

In an embodiment of the invention, when the USB client device 116 does not send the correct second part of the second handshake to the CDP 102 within the time period T4 according to the second protocol, the status of the USB client device 116 must be reset and a first part of a third handshake may be provided by the control circuit 110 according to a third protocol. The number of handshakes that may be used until the proper protocol is found can be two or more. Two handshakes were discussed in to detail in order to better understand an embodiment of the invention. However, any number of handshakes may be used to recognize the correct protocol.

In an embodiment of the invention, after a correct protocol is detected and the USB client device 116 is charged, the CDP 102, through the control circuit 110, monitors the data lines D+ and D− to determine whether the USB client device 116 has been electrically detached from the CDP 102. In an embodiment of the invention, the CDP 102 monitors when the USB client device 116 is detached from the CDP 102 by sensing the voltages on the data lines D+ and D−.

For example, when the CDP 102 senses that both data line D+ and data line D− are below 0.3 volts for a time period T5, the control circuit 110 indicates that the USB client device 116 is detached electrically from the CDP 102. In this example, the time period T5 is 2 seconds. However, other voltages and time periods may be used. When the CDP 102 senses that the USB client device 116 is electrically detached, the control circuit 110 begins testing for a first protocol again.

After the USB client device 116 has been identified through the handshaking process and charged according to the correct protocol, the signal switch 112 may be changed to electrically connect the data lines D+ and D− to a host controller 120. When the host controller 120 is connected to the data lines D+ and D−, data may be communicated between the CDP 102 and the USB client device 116.

Providing power to a USB client device 116 and polling for the correct protocol may also be accomplished when the CDP 102 is "off" or hibernating. "Off" in this example means that most of the functions of the CDP 102 have little or no power supplied to them. However, power is maintained to the power supply 106, the power switch 104, the control circuit 110, the signal switch 112 and the USB controller 120.

Figure 5:
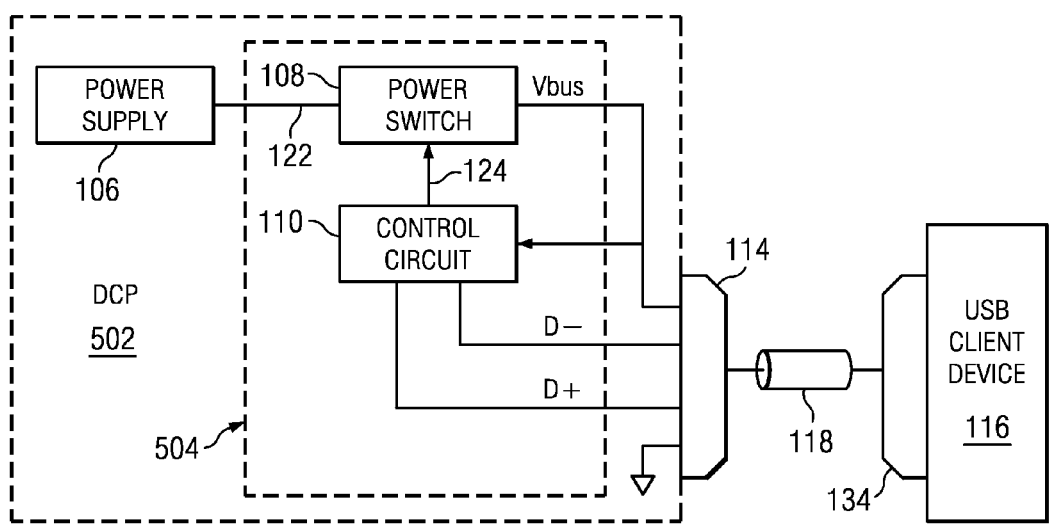
FIG. 5 is a schematic diagram of an embodiment of a dedicated charging port (DCP) for providing power to a USB client device.

FIG. 5 is a schematic diagram of an embodiment of a DCP 502 for providing power to a USB client device 116. A DCP 502 includes but is not limited to a wall-wart or a hub port. A USB client device 116 includes but is not limited to a mobile handset, a keyboard and a PDA (personal digital assistant). In this embodiment, the DCP 502 includes a power supply 106, a power switch 108, a control circuit 110, and a USB connector 114. In this example, a USB cable 118 electrically connects the USB connector 114 to the USB connector 134 on the USB client device 116. The power switch 108 and the control circuit may be integrated on a single integrated circuit 504.

In this embodiment of the invention, the Vbus is connected to the power switch 108, the control circuit 110 and the USB connector 114. The Vbus is used to transfer power from the power supply 106 to the USB client device 116 when the power switch 108 is closed. A power switch 108 may be implemented using transistors such as MOSFETs (metal-oxide semiconductor field-effect transistors), bipolar transistors and JFETs (junction field-effect transistors). The power switch 108 is controlled by the control circuit 110 through electrical connection 124. The control circuit 110 also senses the current drawn through the Vbus and as a result controls how much current is drawn. The maximum amount of current drawn that the USB client device 116 is instructed to be allowed to draw through the Vbus is dependent on the particular protocol used at the time.

In this embodiment, the control circuit 110 includes a charge pump and current-limit circuitry (not shown). The power supply 106 is electrically connected to the power switch 108 through connection 122. The power supply 106 may supply current at any voltage. In this embodiment, the voltage of the power supply 106 is approximately 5 volts. The control circuit 110 also senses voltages on the data lines D+ and D−. In addition, the control Circuit changes the electrical conditions on the data lines D+ and D− by either applying voltages to them or changing the impedance on them.

Data lines D+ and D−, along with Vbus and ground, are electrically connected to USB connector 114. A USB cable 118 connects USB connector 114 to the USB connector 134 mounted on the USB client device 116.

In an embodiment, the power switch 108 and the control circuit 110 may combined on an individual integrated circuit 504.

In this embodiment, before a USB client device 116 is electrically coupled to the DCP 502, the control circuit 110 applies the first part of a first handshake on the data lines D+ and D− by changing the electrical conditions on the data lines D+ and D−. For example, the electrical conditions may be changed by applying voltages on data lines D+ and D−, changing the impedance between data line D+ and data line D−, or changing the impedance to ground for both data lines D+ and D−. Each of these electrical conditions will now be discussed individually in more detail.

FIG. 2 is a schematic diagram of an embodiment of a circuit for providing a first voltage and a second voltage as part of a handshake according to a first protocol. This embodiment of a circuit for providing the first voltage and the second voltage to the data lines D+ and D− includes two voltage dividers VD1 and VD2. These voltage dividers VD1 and VD2, in this example, are located in the control circuit 110. The first voltage divider VD1 includes resistors R1 and R2. In this example, the first voltage is provided at node N1. The second voltage divider VD2 includes resistors R3 and R4. In this example, the second voltage is provided at node N2. The voltage dividers VD1 and VD2 also provide input impedances for the USB client device 116 through data lines D+ and D−.

Other circuits may be used to apply voltages on the data lines D+ and D−. For example, op-amps with a specified output impedance located in the control circuit 110 may be used to provide the first and second voltages.

FIG. 3 is a schematic diagram of an embodiment for providing impedance between data lines D+ and D− as part of a first handshake according to a first protocol. In this example, the first part of a handshake provided by the control circuit 110 includes electrically coupling data line D− to resistor R5 and electrically coupling data line D+ to resistor R5. In this example, the resistor R5 forms an electrical impedance between data lines D+ and D−. The value of R5, in this example, ranges from 0 ohms to 200 ohms.

The source of NFET (n-type field-effect transistor) NF1 is connected to data line D−, the gate of NFET NF1 is connected to node N3 and to the drain of NFET NF1 is connected to resistor R5. The source of NFET (n-type field-effect transistor) NF2 is connected to data line D+, the gate of NFET NF2 is connected to node N4 and the drain of NFET NF2 is connected to resistor R5. The control circuit 110 applies a high logic level to nodes N3 and N4 when a first part of a handshake requires an impedance between data lines D+ and D−.

FIG. 4 is a schematic diagram of an embodiment for providing impedance from each data line D+ and D− to ground as a first part of a first handshake. In this example, the first part of the first handshake provided by the control circuit 110 includes electrically coupling resistor R6 to ground and electrically coupling resistor R7 to ground. The values of R6 and R7, in this example, range from 0 ohms to 200 ohms.

The source of NFET (n-type field-effect transistor) NF3 is connected to ground, the gate of NFET NF3 is connected to node N5 and the drain of NFET NF3 is connected to resistor R6. The resistor R6 is also connected to data line D−. The source of NFET (n-type field-effect transistor) NF4 is connected to ground, the gate of NFET NF4 is connected to node N6 and the drain of NFET NF4 is connected to resistor R7. The resistor R7 is also connected to data line D+. The control circuit 110 applies a high logic level to nodes N3 and N4 when a first part of a handshake requires an impedance to ground on data lines D+ and D−.

When the first part of the first handshake is applied to the data lines D+ and D− according to a first protocol, the control circuit 110 waits for a predetermined time period T1 for the USB client device 116 to apply a second part of the first handshake to the data lines D+ and D− according to the first protocol. The second part of the first handshake may include applying voltages or currents to the data lines D+ and D− by the USB client device 116 or not applying a voltage by the USB client device 116. The specific voltages or currents applied during the second part of the handshake are determined by the particular protocol used. No response from the USB client device may also be used as a second part of the first handshake. No response from the USB client includes not applying voltages or currents to the data lines D+ and D− by the USB client device 116.

In this embodiment, the second part of the first handshake is correct when the USB client device 116 does not respond to the first part of the first handshake in a time period T2. The time period T2 in this example is 20 milliseconds. In this embodiment, after the control circuit 110 recognizes that the first handshake is correct, the DCP 502 does not poll for another handshake. When the first handshake is correct, power continues to be supplied from the DCP 502 to the USB client device 116 and the USB client device 116 recognizes that power may be supplied according to the particular charging specification of the first protocol if required.

In this embodiment, the first protocol may allow the DCP 502 to supply 0.5 amps or more of current for charging the USB client device 116. Power is supplied by the power supply 106 through electrical connection 122 into power switch 108. Power switch 108 is enabled and controlled by control circuit 110. When power switch 108 is enabled, current is drawn from the power supply 106 through the Vbus to charge the USB client device 116. The current drawn from the power supply 106 is also sensed by the control circuit 110.

In this embodiment of the invention, when the USB client device 116 applies voltages or currents to the data lines D+ and/or D−, within the time period T2, the second part of the first handshake is incorrect. In this embodiment of the invention, when the first handshake is incorrect, the status of the USB client device 116 must be reset and a first part of a second handshake is provided by the control circuit 110 according to a second protocol. In another embodiment, the status of the USB client device 116 does not need to be reset and the first part of the second handshake is provided by the control circuit 110 according to the second protocol.

In this embodiment of the invention, the status of the USB client device 116 is reset by powering down the USB client device 116, waiting a time period T3 and then applying power to the USB client device 116. The USB client device 116 is powered down by opening the power switch 108 and discharging the Vbus to a predetermined voltage. In this example, the predetermined voltage is 0.3 volts or less and the wait time T3 is approximately 300 milliseconds. Power is applied to the USB client device 116 by closing the power-switch 108 and applying power from the power supply 106 to the Vbus.

In this embodiment of the invention, after the USB client device 116 has been reset and power applied to the USB client device 116, a first part of a second handshake is applied to the data lines D+ and D− according to the second protocol. The first part of the second handshake may be applied in the same way as the first part of the first handshake was applied as previously discussed. In this embodiment of the invention, the first part of the second handshake includes applying an impedance between data line D+ and D− as shown in FIG. 3. However, in another embodiment, the control circuit 110 may apply voltages to data lines D+ and D− as shown in FIG. 2. In another embodiment, the control circuit may apply an impedance from the D+ data line to ground and an impedance from the D− data line to ground as shown in FIG. 4.

In this embodiment, after the first part of the second handshake has been applied to the data lines D+ and D− according to the second protocol, the control circuit 110 waits for a predetermined time period T4 for the USB client device 116 to apply a second part of the second handshake to the data lines D+ and D− according to the second protocol. In this embodiment, the time period T4 is 20 milliseconds. The second part of the second handshake may include applying voltages or currents to the data lines D+ and D− by the USB client device 116 or not applying voltages or currents by the USB client device 116. The specific voltages or currents applied during the second part of the handshake are determined by the particular protocol used. For example, the protocol may be the Chinese PRC Telecommunications Industry Standard YD/T 1591-2006 or the USB 2.0 Battery Charging Specification 1.1 (BSC1.1).

In an embodiment of the invention, when the USB client device 116 does not send the correct second part of the second handshake to the DCP 502 within the time period T4 according to the second protocol, the status of the USB client device 116 must be reset and a first part of a third handshake is provided by the control circuit 110 according to a third protocol. The number of handshakes that may be used until the proper protocol is detected can be three or more. Two handshakes were discussed in detail in order to better understand an embodiment of the invention. However, any number of handshakes may be used to recognize the correct protocol.

In this example, when the USB client device 116 sends the second part of the second handshake to the data lines D+ and D− within the time period T4, power continues to be supplied from the DCP 502 to the USB client device 116 and the USB client device 116 recognizes that power may be supplied according to the particular charging specification of the second protocol if required. For example, the second protocol may indicate to the USB client device 116 that at least 0.5 amps of charging current may be drawn from the DCP 502 if required. Power is supplied by the power supply 106 through electrical connection 122 into power switch 108. Power switch 108 is enabled by control circuit 110. When power switch 108 is enabled, current is drawn from the power supply 106 through the Vbus to charge the USB client device 116. The current drawn from the power supply 106 is also sensed by the control circuit 110.

After the USB client device 116 is charged, the DCP 502 monitors the data lines D+ and D− to determine whether the USB client device 116 has been electrically detached from the DCP 502. In an embodiment, the DCP 502 monitors when the USB client device 116 is detached from the DCP 502 by sensing the voltages on the data lines D+ and D−.

For example, when the DCP 502 senses that both data line D+ and data line D− are below 0.3 volts for a time period T5, the control circuit 110 indicates that the USB client device 116 is detached electrically from the DCP 502. In this example, the time period T5 is 2 seconds. However, other voltages and time periods may be used. When the DCP 502 senses that the USB client device 116 is electrically detached, the control circuit 110 begins testing for the first protocol again.

Figure 6:
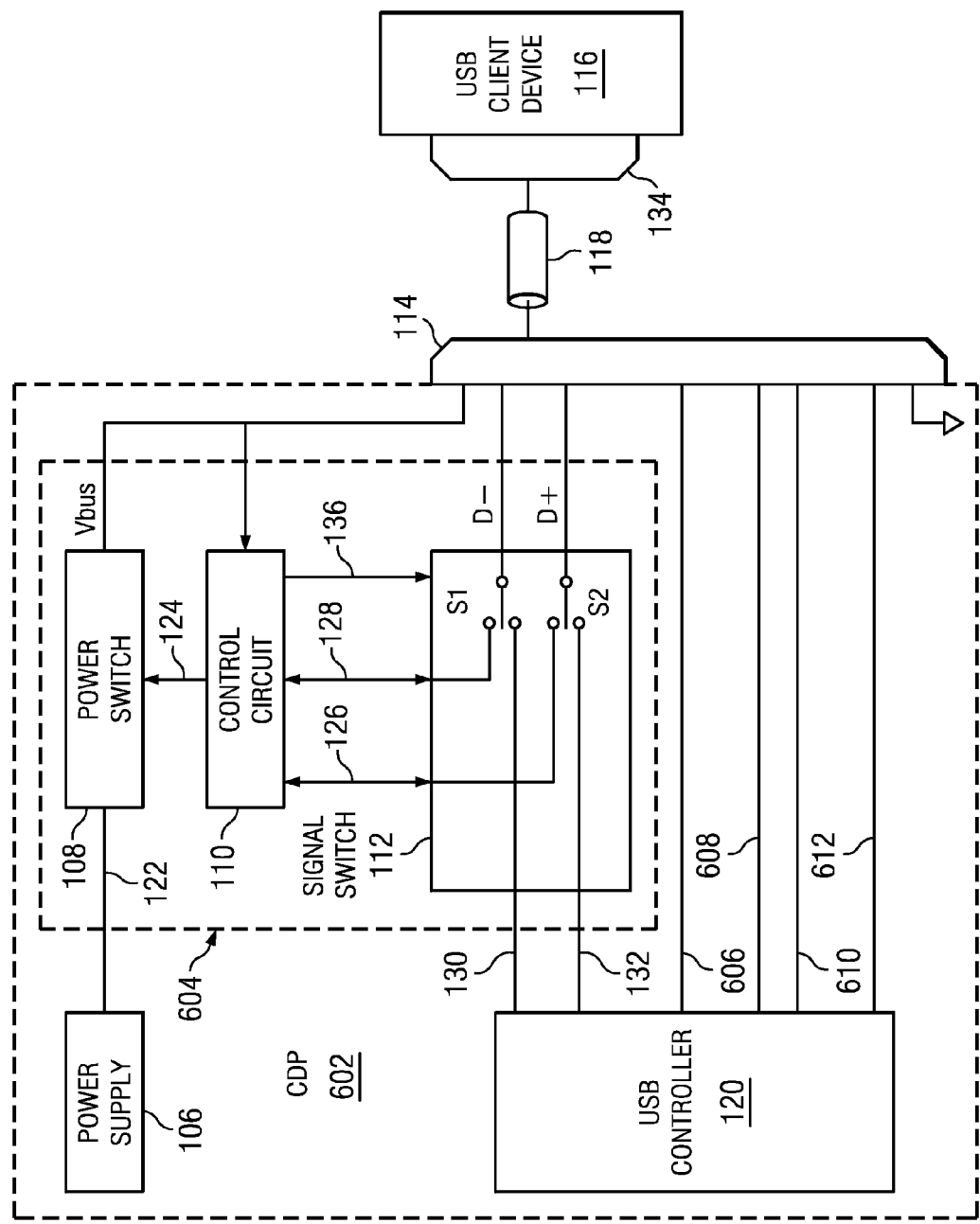
FIG. 6 is a schematic diagram of an embodiment of a charging down-stream port (CDP) for providing power to a USB client device.

FIG. 6 is a schematic diagram of an embodiment of a charging down-stream port (CDP) for providing power to a USB client device 116. FIG. 6 differs from FIG. 1 in that FIG. 6 has additional data lines 606, 608, 610 and 612 connected from the USB controller 120 to the USB connector 114. The data lines 606, 608, 610 and 612 are used for communication between the USB controller 120 and USB client device 116. In this embodiment, four data lines 606, 608, 610, and 612, in addition to data lines D+ and D− are shown. However, more data lines or fewer data lines may be used for communication between the USB controller 120 and USB client 116. The addition of additional data lines 606, 608, 610 and 612 does not change the method of polling for a correct handshake as described previously.

In an embodiment, the power switch 108, the control circuit 110 and the signal switch 112 may combined on an individual integrated circuit 604.

FIG. 7 is a flow chart illustrating an embodiment of a method of providing power to a USB client device 116 and polling for a correct protocol. During step 702 power is applied to a USB client device 116 in a low current mode when the USB client device 116 is electrically connected to the USB to host device 102. For example, the low current mode could limit the maximum amount of current drawn to 0.5 amps. In step 704, the USB host device 102 provides a first part of a first handshake according to a first protocol to the data lines D+ and D−. The first handshake includes a control circuit 110 applying a first voltage to the data line D+ and a second voltage to the data line D−. In another embodiment, the control circuit 110 may apply an impedance between data lines D+ and D−. In another embodiment, the control circuit may apply an impedance from the D+ data line to ground and an impedance from the D− data line to ground.

When the first part of the first handshake is applied to the data lines D+ and D−, the control circuit 110 waits, step 708, for a predetermined time period T1 for the USB client device 116 to apply a second part of the first handshake to the data lines D+ and D−. The second part of the first handshake may include applying voltages or currents to the data lines D+ and D− by the USB client device 116 or not applying voltages or currents by the USB client device 116. The specific voltages or currents applied during the second part of the handshake are determined by the particular protocol used. In this embodiment, the second part of the first handshake includes applying no voltages or currents. In this embodiment, when no voltages or currents are applied by the USB client device 116, the handshake is correct.

In this example, when the USB client device 116 supplies the second part of the first handshake to the USB host device 102 within a time period T1 according to the first protocol, the first handshake is correct. When the first handshake is correct, power continues to be supplied, step 710, from the USB host device 102 to the USB client device 116 and the USB client device 116 recognizes that power may be supplied according to the particular charging specification of the first protocol if required. The time period T1 in this example is 20 milliseconds. In this example, the first protocol may allow the USB host device 102 to supply 0.5 amps or more of current for charging the USB client device 116.

In this embodiment of the invention, when the USB client device 116 does not send the correct second part of the first handshake to the USB host device 102 within the time period T1 according to the first protocol, the status of the USB client device 116 must be reset and a first part of a second handshake is provided by the control circuit 110. In another embodiment, the status of the USB client device 116 does not need to be reset and the first part of the second handshake is provided by the control circuit 110.

In this embodiment of the invention, the status of the USB client device 116 is reset by powering down the USB client device 116, waiting a time period T3 and then applying power to the USB client device 116. The USB client device 116 is powered down by opening the power switch 108 and discharging the Vbus to a predetermined voltage. In this example, the predetermined voltage is 0.3 volts or less and the wait time T3 is approximately 300 milliseconds. Power is applied to the USB client device 116 by closing the power switch 108 and applying power from the power supply 106 to the Vbus.

In this embodiment of the invention, after the USB client device 116 had been reset and power has been applied to the USB client device 116, a first part of a second handshake according to a second protocol is applied, step 712, to the data lines D+ and D−. In this embodiment, the first part of the to second handshake includes applying an impedance between data line D+ and D− as shown in FIG. 3. However, in another embodiment, the control circuit 110 may apply voltages to data lines D+ and D−. In another embodiment, the control circuit 110 may apply an impedance from the D+ data line to ground and an impedance from the D− data line to ground.

In this embodiment, after the first part of the second handshake has been applied to the data lines D+ and D−, the control circuit 110 waits, step 714, for a predetermined time period T4 for the USB client device 116 to apply a second part of the second handshake to the data lines D+ and D−. In this embodiment, the time period T4 is 2 seconds. The second part of the second handshake may include applying voltages or currents to the data lines D+ and D− by the USB client device 116 or not applying voltages or currents by the USB client device 116. The specific voltages or currents applied during the second part of the second handshake are determined by the particular protocol used. For example, the protocol may be the Chinese PRC Telecommunications Industry Standard YD/T 1591-2006 or the USB 2.0 Battery Charging Specification 1.1 (BSC1.1).

In this example, the second part of the second handshake includes the USB client device 116 driving either data line D+ or data line D− to 0.4 volts or higher for the time that the USB client device 116 is connected to the DCP host device 502.

In this example, when the USB client device 116 sends, step 716, the second part of the second handshake to the data lines D+ and D− within the time period T4, power continues to be supplied from the USB host device 102 to the USB client device 116 and the USB client device 116, step 718, recognizes that power may be supplied according to the particular charging specification of the second protocol if required. For example, the second protocol may indicate to the USB client device 116 that at least 0.5 amps of charging current may be drawn from the USB host device 102.

In this example, when the USB client device 116 does not send the second part of the second handshake to the data lines D+ and D− within the time period T4 according to the second protocol, the method returns to step 702 and power is supplied to a USB client device 116 in a low current mode when the USB client device 116 is electrically connected to the USB host device 102.

After the USB client device 116 is charged according to the first or second protocol, the USB host device 102 monitors, step 720, the data lines D+ and D− to determine whether the USB client device 116 has been electrically detached from the USB host device. In an embodiment of the invention, the USB host device monitors when the USB client device 116 is detached from the USB host device by sensing the voltages on the data lines D+ and D−.

For example, when the USB host device senses, step 722, that both data line D+ and data line D− are below 0.3 volts for a time period T4, the control circuit 110 indicates that the USB client device 116 is detached electrically from the USB host device 102. In this example, the time period T4 is 2 seconds. However, other voltages and time periods may be used. When the USB host device 102 senses that the USB client device 116 is electrically detached, the method returns to step 702 and power is supplied to a USB client device 116 in a low current mode when the USB client device 116 is electrically connected to the USB host device 102.

The foregoing description has been presented for purposes of illustration and description. It is not intended to be exhaustive or to limit the is invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the zo particular use contemplated. It is intended that the appended claims be construed to include other alternative embodiments except insofar as limited by the prior art.

What is claimed is:

1. A method for providing power to a USB client device and polling for a correct protocol comprising:
   supplying power from a USB host device to the USB client device in a low current mode;
   providing a first part of a first handshake from a USB host device to the USB client device, the first handshake determined by a first protocol;

monitoring the USB client device by the USB host device for a second part of the first handshake, where the second part of the first handshake includes one of a predetermined response and no response to the first part of the first handshake;

recognizing that power may be supplied from the USB host device to the USB client device according to the first protocol when the second part of the first handshake is received by the USB host device;

if and only if the first handshake is not satisfied, providing a first part of a second handshake from the USB host device to the USB client device after the second part of the first handshake is not received by the USB host device, the second handshake determined by a second protocol;

recognizing that power may be supplied from the USB host device to the USB client device according to the second protocol when a second part of the second handshake is received by the USB host device.

2. The method for claim 1 wherein the first part of the first handshake comprises:
connecting a first voltage from the USB host device to a D+ data line;
connecting a second voltage from the USB host device to a D− data line.

3. The method of claim 2 wherein the second part of the first handshake comprises:
applying a third voltage and a fourth voltage from the USB client device to the D− data line and the D+ data line respectively for a first time period T2.

4. The method of claim 3 wherein the third voltage and the fourth voltage are logical high values; and
wherein the first time period T2 is 20 milliseconds.

5. The method of claim 1 wherein the first part of the first handshake comprises:
connecting a first impedance between the D+ data line and the D− data line.

6. The method for claim 1 wherein the first part of the first handshake comprises:
connecting a second impedance from D+ data line to ground;
connecting a third impedance from the D− data line to ground.

7. The method of claim 1 wherein the second part of the first handshake comprises:
connecting a first current source to data line D+.

8. The method of claim 1 wherein the second part of the first handshake comprises:
connecting a second current source to data line D−.

9. The method for claim 1 wherein the first part of the second handshake comprises:
coupling a fifth voltage from the USB host device to a D+ data line;
coupling a sixth voltage from the USB host device to a D− data line.

10. The method of claim 1 wherein the first part of the second handshake comprises:
coupling a fourth impedance between the D+ data line and the D− data line.

11. The method for claim 1 wherein the first part of the second handshake comprises:
coupling a fifth impedance from D+ data line to ground;
coupling a sixth impedance from the D− data line to ground.

12. The method of claim 1 wherein the second part of the second handshake comprises:
applying a seventh voltage and an eighth voltage from the USB client device to the D− data line and the D+ data line respectively for a second time period T4.

13. The method of claim 1 wherein the second part of the second handshake comprises:
connecting a third current source to data line D+.

14. The method of claim 1 wherein the second part of the second handshake comprises:
connecting a fourth current source to data line D−.

15. A dedicated down-stream port for providing power to a USB client device comprising:
a power supply;
a power switch, the power switch connected to the power supply and a Vbus;
a USB connector, the USB connector connected to the Vbus, a D+ data line, a D− data line, and a ground;
a signal switch, the signal switch connecting the data lines to a control circuit during identification of the USB client device and connecting the data lines to a USB host controller when data is sent on the data lines;
wherein the control circuit is connected to the power switch, the signal switch, and the Vbus;
wherein power is provided from the dedicated down-stream port to the USB client device;
wherein the control circuit provides a first part of a first handshake to the data lines, the first handshake determined by a first protocol;
wherein the control circuit monitors the data lines for a second part of the first handshake sent by the USB client device, where the second part of the first handshake includes one of a predetermined response and no response to the first part of the first handshake;
wherein electrical power from the power supply is applied to the Vbus according to the first protocol when the second part of the first handshake is received by the control circuit within a time period T1;
wherein if and only if the first handshake is not satisfied the control circuit provides a first part of a second handshake to the data lines after the second part of the first handshake is not received, the second handshake determined by a second protocol;
wherein electrical power from the power supply is applied to the Vbus according to the second protocol when the second part of the second handshake is received by the control circuit within a time period T2 by the control circuit.

16. The dedicated down-stream port of claim 15 wherein a USB host device is selected from a group consisting of a laptop computer, a notebook computer and a desktop computer.

17. The dedicated down-stream port of claim 15 wherein the USB client device is selected from a group consisting of a mobile handset, keyboard and personal digital assistant.

18. The dedicated down-stream port of claim 15 wherein the power switch, the control circuit and the signal switch are integrated on a single integrated chip.

19. The dedicated down-stream port of claim 15 wherein power to the USB host device is off.

20. A dedicated charging port for providing power to a USB client device comprising:
a power supply;
a power switch, the power switch connected to the power supply and a Vbus;
a USB connector, the USB connector connected to the Vbus, a D+ data line, a D− data line, and a ground;
a control circuit, the control circuit connected to the power switch, the D+ data line, the D− data line, and the Vbus;

wherein power is provided from the dedicated charging port to the USB client device;

wherein the control circuit provides a first part of a first handshake to the data lines, the first handshake determined by a first protocol;

wherein the control circuit monitors the data lines for a second part of the first handshake sent by the USB client device, where the second part of the first handshake includes one of a predetermined response and no response to the first part of the first handshake;

wherein the USB client device recognizes that power may be applied to the Vbus according to the first protocol when the second part of the first handshake is received by the control circuit within a time period $T2$;

wherein if and only if the first handshake is not satisfied the control circuit provides a first part of a second handshake to the data lines after the second part of the first handshake is not received, the second handshake determined by a second protocol;

wherein the USB client device recognizes that power may be applied to the Vbus according to the second protocol when the second part of the first handshake is received by the control circuit within a time period $T2$.

* * * * *